United States Patent [19]

Marbach

[11] Patent Number: 4,798,638
[45] Date of Patent: Jan. 17, 1989

[54] METHOD FOR HEAT SEALING A FACING SHEET ONTO A PLASTIC FOAM SHELL

[75] Inventor: Philip J. Marbach, Doylestown, Pa.

[73] Assignee: Personal Products Company, Milltown, N.J.

[21] Appl. No.: 897,172

[22] Filed: Aug. 15, 1986

[51] Int. Cl.$^4$ ............................ B65B 7/00; B65B 7/16
[52] U.S. Cl. ........................................ 156/69; 156/250; 156/272.2; 156/292; 156/308.4
[58] Field of Search ............... 156/69, 73.1, 258, 73.5, 156/257, 250, 264, 274.4, 274.6, 290, 292, 308.2, 308.4, 275.1, 275.3, 309.6, 380.7, 380.2, 380.8, 380.4, 380.5, 380.6, 556, 566, 272.2; 269/21; 279/3; 264/511, 550, 551, 554; 425/80.1, 83.1, 519, 290.2, 297, 395, 398–399, 388, 125

[56] References Cited

U.S. PATENT DOCUMENTS

| | | | |
|---|---|---|---|
| 3,383,256 | 5/1968 | Carbone | 156/69 |
| 3,460,822 | 8/1969 | Link | 269/21 |
| 3,508,376 | 4/1970 | Beniss | 156/292 |
| 3,738,886 | 6/1973 | Southgate | 156/274.4 |
| 3,813,846 | 6/1974 | Doering | 156/69 |
| 3,817,806 | 6/1974 | Anderson | 156/285 |
| 3,933,559 | 1/1976 | Watanabe | 156/257 |

*Primary Examiner*—Merrell C. Cashion, Jr.

[57] ABSTRACT

A method and apparatus for heat sealing a thin porous facing sheet onto the perimeter of a flexible ethylene-containing foam shell having a non-planar face surface. In the method, the facing sheet is applied to the non-planar surface of the foam shell attached to a foam sheet, and the facing sheet is clamped by a die assembly and rapidly heated and sealed onto the shell perimeter by a plug containing a heating element shaped to the shell perimeter being clamped onto the facing sheet and shell. To provide a close non-wrinkled fit of the facing sheet onto the foam shell, the facing sheet is first slit at spaced intervals transverse to the sheet length dimension and intermediate the foam shells before being clamped and heat sealed onto the formed shell perimeter. Apparatus for transversely slitting the facing sheet and for heat sealing it onto the formed shells is also disclosed.

4 Claims, 6 Drawing Sheets

METHOD FOR HEAT SEALING A FACING SHEET ONTO A PLASTIC FOAM SHELL

BACKGROUND OF INVENTION

This invention relates to heat sealing a thin porous facing sheet onto a non-planar foam surface. It relates particularly to method and apparatus for rapidly heat sealing a thin fibrous facing sheet onto flexible ethylene-containing closed cell foam shells each having a non-planar upper surface.

Heat sealing fibrous plastic sheet materials together by heat softening the mating surfaces is generally known. Such heat sealing operations are usually accomplished on planar surfaces and onto solid materials at relatively slow cycle times of many seconds per cycle. However. rapidly heat sealing plastic fibrous sheets onto ethylene-containing foam materials at short cycle times less than about 5 seconds has presented various difficulties and unreliable sealing results, particularly when heat sealing onto non-planar formed foam surfaces. Such difficulties with rapid heat sealing have now been unexpectedly overcome by the present invention.

SUMMARY OF INVENTION

This invention provides a method and apparatus for rapidly attaching a thin porous facing sheet firmly onto a flexible ethylene-containing polymer foam sheet material by heat sealing wherein the foam sheet incorporates a formed shell. The facing sheet is a liquid-permeable generally hydrophobic film or fabric. Typical facing materials include polyester nonwovens polypropelene nonwovens, perforated films such a polyethylene film and the like. The facing sheet is a thermally bondable sheet, preferably bondable in a temperature range compatible with the ethylene-containing foam shell. The facing sheet thickness is usually 0.001–0.020 inch or more and is preferably 0.005–0.015 inches thick. The foam sheet can be an ethylene-containing polymer foam shell prepared by known thermal molding processing. A preferred formulation for forming the ethylene-containing polymer foam material is identified as Volara Type A which is a crosslinked polyethylene foam, manufactured and sold by Voltek Inc., Lawrence, Mass. The expression "ethylene-containing polymer foam" used herein includes polyethylene homopolymer and ethylene-containing copolymers preferably containing a major portion, by weight, of ethylene. It is preferred that the polymer present be crosslinked. Preferred co-monomers, for preparing the polymers, include vinyl acetate, acrylic and methylacrylic acids and esters such as ethyl acrylate. Blends of such polymers can also be used. The foam sheet is preferably a closed-cell polyethylene foam material having a thickness of 0.050–0.250 inch and shaped to contain a shell having a depth of at least about 0.5 inch and a non-planar sealing surface. More preferably, the foam shell has a shape of a formed elongated boat-shaped shell having depth of 0.75–2.5 inch, a length of at least about 3.0 inches and preferably 4–12 inches and width of 2–5 inches. If desired, a fibrous absorbent structure can be provided in the formed shell between the facing sheet and the shell.

More specifically, the present invention provides a method for applying a porous facing sheet onto a formed flexible plastic foam shell and includes: providing a formed plastic foam shell having a central cavity depth of at least about 0.5 inch and integrally attached to a foam sheet, the shell having a curved non-planar upper surface, and applying a thin porous facing sheet onto the upper non-planar surface, of the formed foam shell. The combined shell and facing sheet are moved intermittently to near an electrical heating and sealing unit, and the facing sheet and adjoining foam shell are contacted with the heating unit to rapidly heat the facing sheet and shell non-planar surface with the heating unit to their softening temperature and heat seal the facing sheet onto the non-planar perimeter of the foam shell so as to provide a heat sealed covered flexible shell product. In order to heat seal the facing sheet smoothly onto the non-planar shell surface, the facing sheet is transversely slit in selected central locations outside the shell so as to permit the central portions of the facing sheet to move laterally towards the shell prior to heat sealing the sheet onto the formed shell.

The facing sheet is preferably a porous non-woven fibrous web composed mainly of polyester fibers. The formed shell is preferably a closed-cell polyethylene-containing polymer foam material having a softening temperature of 130°–250° F. The heat sealing is accomplished by a die assembly in which the upper die unit sealing surface is heated to 200°–500° F. The heating and sealing cycle time for heat sealing the facing sheet onto the foam shell is 0.5–2.5 seconds.

The present invention also includes apparatus for clamping and selectively slitting the porous facing sheet and then heat sealing the facing sheet onto the perimeter of the formed shells which are integrally attached to a foam sheet. This apparatus comprises a slitting means which includes an upper member and a lower member adapted for clamping the facing sheet therebetween, the upper member being provided with dual knives which are supported on rails attached to the upper clamping member. The knives are moved transversely apart by pneumatic piston means to selectively slit the facing sheet in central portions of the sheet as described above. The apparatus also includes a sealing die assembly or means which includes a lower die unit containing a plurality of cavities each shaped for receiving a formed shell, and an upper die unit containing a plurality of plugs each shaped for fitting into a lower die cavity. The plugs are shaped for contacting the perimeter of the foam shells and are electrically heated for heat sealing the facing sheet onto the perimeter of the shell(s).

The present invention advantageously provides an improved method and apparatus for rapidly heat sealing a porous sheet onto a flexible shaped ethylene-containing foam shell so as to produce a covered shell product at cycle times of only 1–6 seconds. By selectively transversely slitting the facing sheet prior to the heat sealing step, the facing sheet is able to conform to the shell shape while being made substantially smooth and uniformly sealed to the shell non-planar surface and provide a more attractive and desirable product.

DESCRIPTION OF INVENTION

Figure 1:
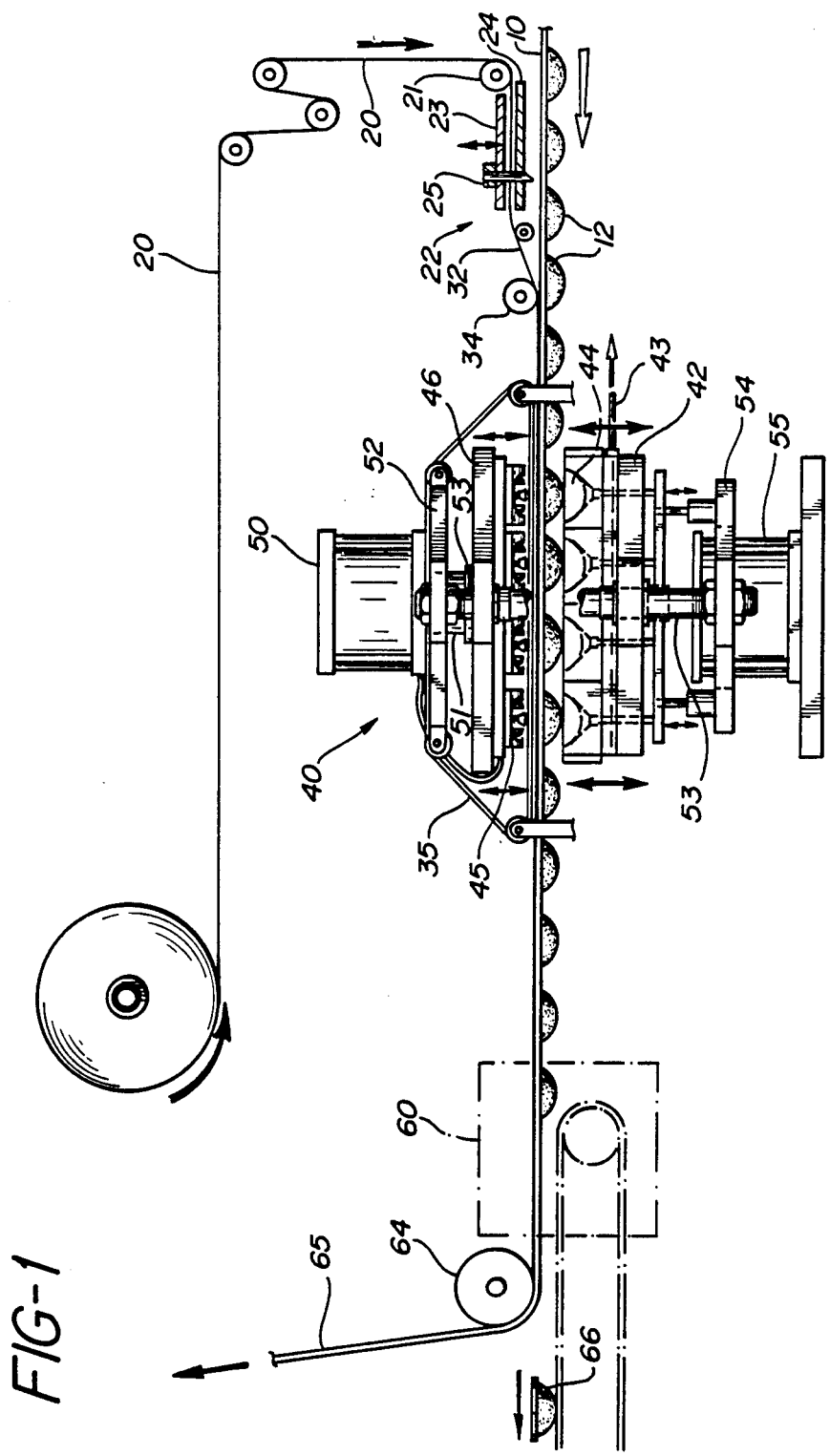
FIG. 1 shows a schematic elevation view of essential steps of transversely slitting and heat sealing a facing sheet onto a foam shell in accordance with the present invention.

The invention will now be described in greater detail according to a preferred embodiment with reference to the drawings. As is generally shown schematically in FIG. 1, an elongated flexible ethylene-containing foam sheet is provided at 10 having a plurality of spaced concave shaped cavities or shells 12 integrally formed in the sheet. If desired, the shells 12 can each contain a flexible fibrous absorbent structure (not shown). The shells 12 are preferably oriented transversely to the sheet length and preferably there are provided at least two shells oriented in an end-to-end relationship transversely across the sheet width, and there may be up to four shells wide oriented in an end-to-end pattern across the sheet width. The foam sheet is usually supported and carried forward by means of multiple spaced clips 14 attached to the opposite edges of the sheet, with the clips being attached to a roller chain 15, as generally shown in a perspective view by FIG. 5.

Figure 2:
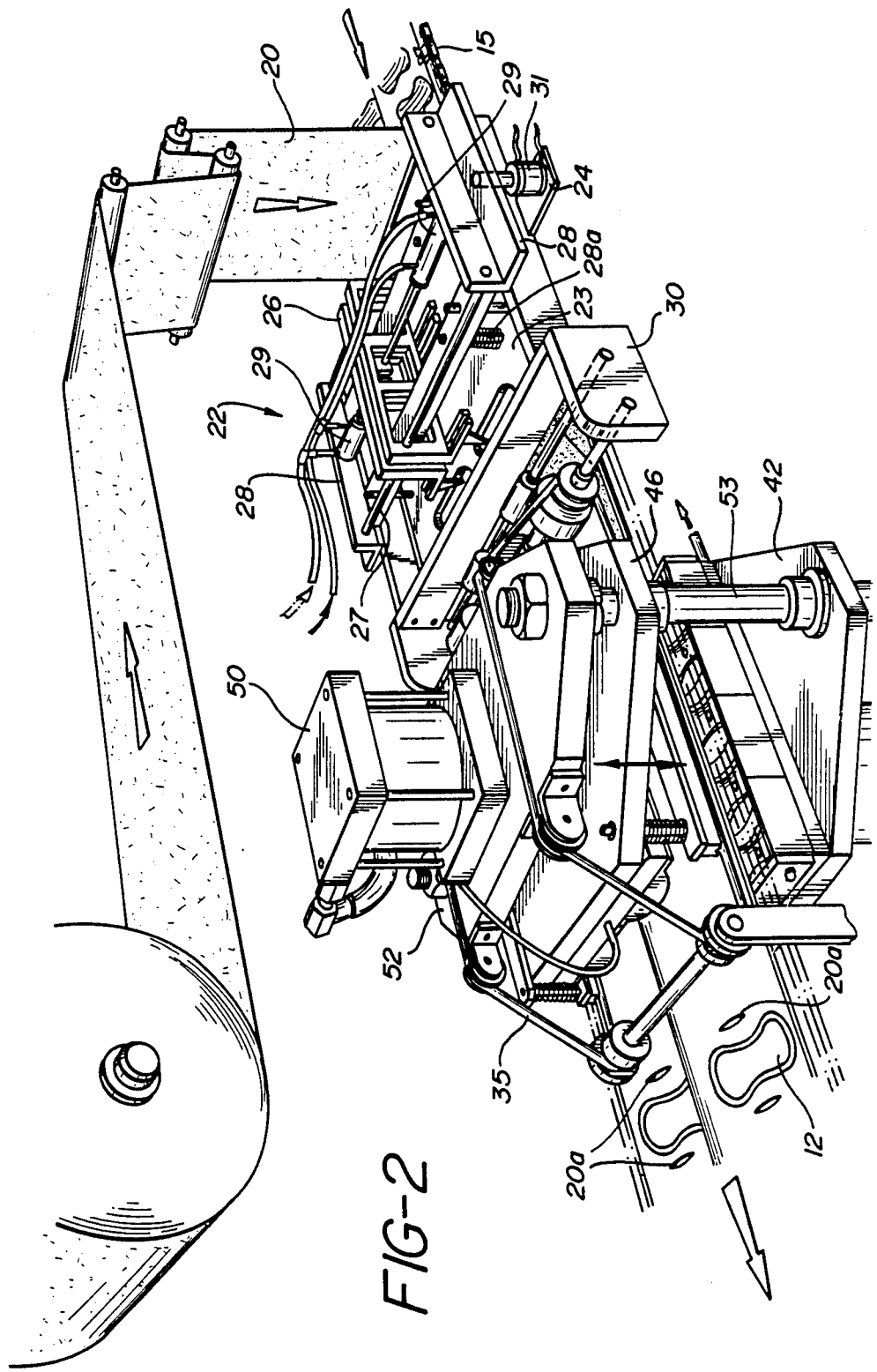
FIG. 2 shows a perspective view of the combined transverse slitting and heat sealing steps and apparatus, and generally shows a slit pattern in the facing sheet relative to the shells formed in the foam sheet.

A facing sheet of a thin fibrous material is provided at 20 from guide roller 21 and aligned for mating with the foam sheet 10 on its upper side. The facing sheet 20 is passed through a slitting step provided by slitting device 22 to transversely slit the facing sheet to permit it to be subsequently sealed smoothly onto the curved upper surfaces of the shells 12. In this slitting device 22, the facing sheet 20 is clamped between an upper plate 23 and lower plate 24. Dual slitting knives 25 mounted on the upper plate 23 are moved transversely across the sheet 20, intermediate the shells 12, so as to produce multiple spaced parallel slits 20a in the central portion of the sheet 20 between adjacent shells 12, as is generally shown in FIG. 2. The dual knives 25 are retained by holder 26 which is supported by transverse rails 27 rigidly attached to the side of member 28 upper plate 23. The knife holders 26 are actuated by dual pneumatic pistons 29 which move the knives outwardly for the slitting of the facing sheet 20. Also, the upper clamping plate 23 is moved vertically downward relative to lower plate 24 by dual pneumatically actuated pistons 31 located at the sides of plate 24 to intermittently clamp the sheet 20 between the plates. The lower plate 24 is rigidly attached to a frame 30, which is in turn rigidly supported by a base member (not shown).

Figure 3:
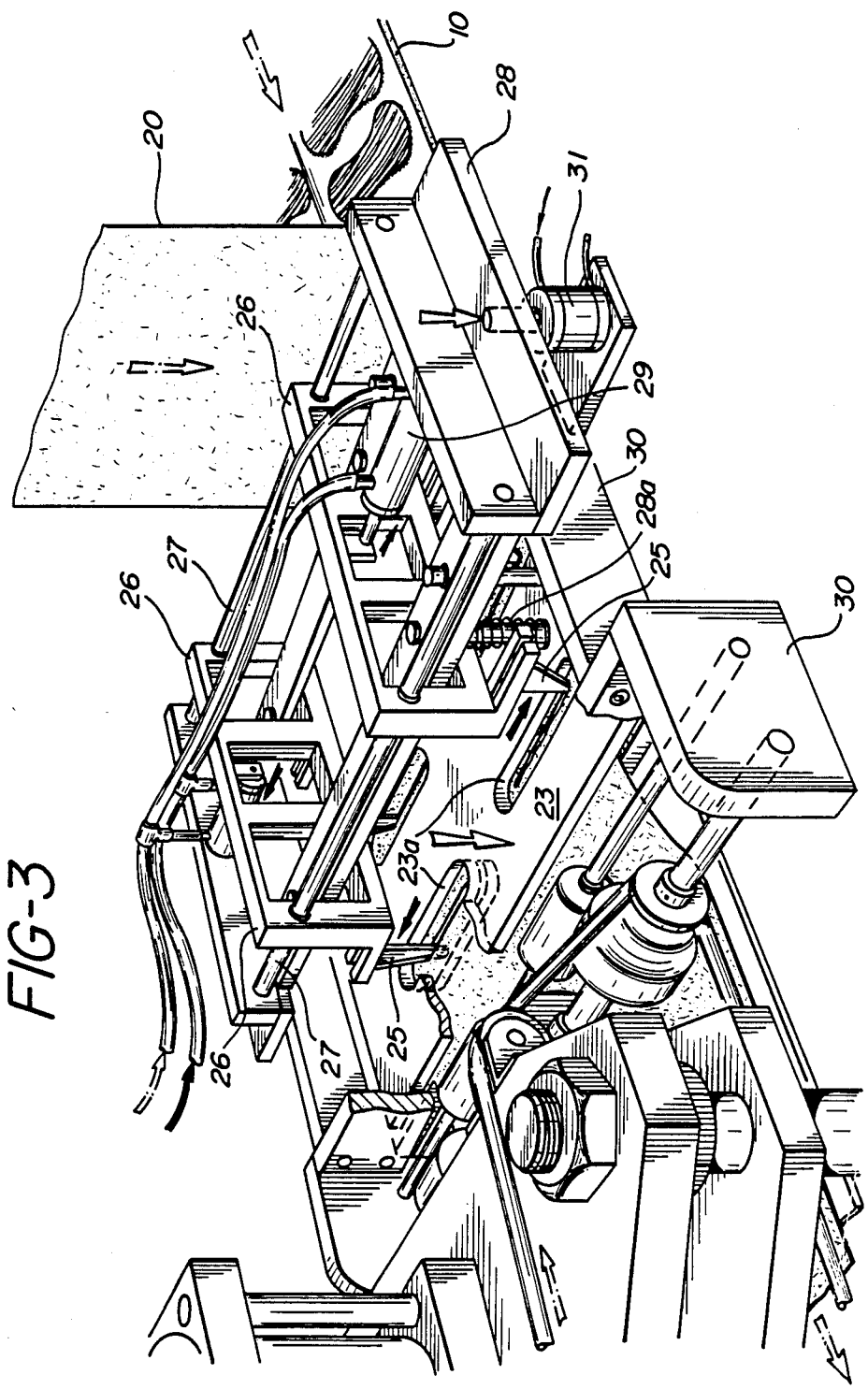
FIG. 3 shows an enlarged perspective view of the facing sheet slitting step and apparatus as used in the invention.

A more detailed perspective view of the facing sheet slitting method step and apparatus is shown by FIG. 3 in which the slitting assembly components are seen more clearly. The lower plate 24 is supported by frame 30. The upper plate 23 is moved vertically relative to lower plate 24 by dual actuator pistons 31 provided between the plates. Also, upper plate 23 is spring-loaded by at least two compression springs 28a provided between plate 23 and frame 26 to provide a clamping pressure for plate 23 downwardly against the facing sheet 20 during the slitting step. The knives 25 move transversely in plate 23a provided in upper plate 23.

Figure 5:
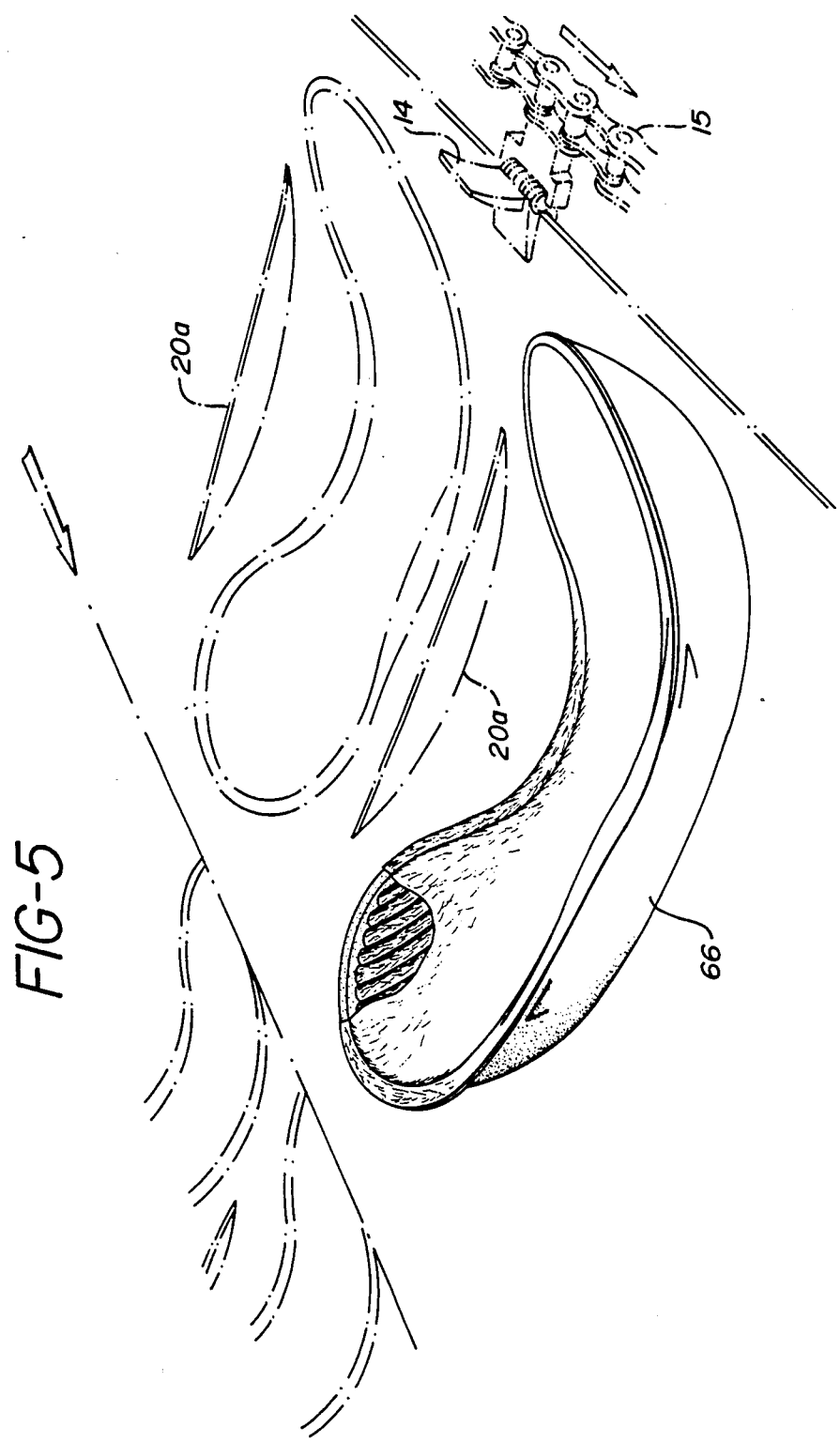
FIG. 5 shows a perspective view of one typical product having a non-planar upper surface onto which a facing sheet is heat sealed onto the perimeter of the product in accordance with the invention.

Referring again to FIG. 1, following the facing sheet slitting step, the resulting slit facing sheet at 32 is forced downwardly by spaced rollers 34 and endless belt 35 so as to place the facing sheet against the foam sheet 10. These dual mating sheets 32 and 10 are then passed together to the heat sealing step 40 for sealing the slit facing sheet 32 onto foam sheet 10. For this heat sealing step, the slit facing sheet 32 is forced downwardly adjacent the formed shells 12, each shell having an upper surface which is non-planar and downwardly curved in its central portion, as is generally shown in FIG. 5.

The lower die unit 42 has four adjacent concave cavities 44 provided therein. The formed shells 12 are drawn downwardly into cavities 44 by suction cups 36 which are vertically movable by pistons 37. Also each formed shell 12 of sheet 10 is forced downwardly into the cavities 44 by a mating plug member 45 attached to upper die unit 46. The upper die unit 46 also has a heat sealing surface 48 including heating element 49 provided adjacent to the heat conductive plug member 45 which is sized to heat seal a peripheral area located outwardly from the plug edge by a distance of about 0.06–0.40 inches. The plug 45 is made of a heat conductive metal such as aluminum or copper. The sealing surface 48 is heated electrically by heating element 49 to a temperature of about 200°–500° F. Vertical movement of the upper die member 46 is effected by an actuator piston 50 having vertical rod 51 attached to the upper die member. The actuator piston 50 is supported by stationary flange 52, which is itself supported by dual vertical support columns 53 attached to base plate 54. Vertical movement of the lower die unit 42 is effected by piston 55, which includes a vertically stabilizing mechanism (not shown) which positions the lower die unit rigidly so as to withstand the downward force of the heat sealing plugs from the upper die unit 46.

Figure 4:
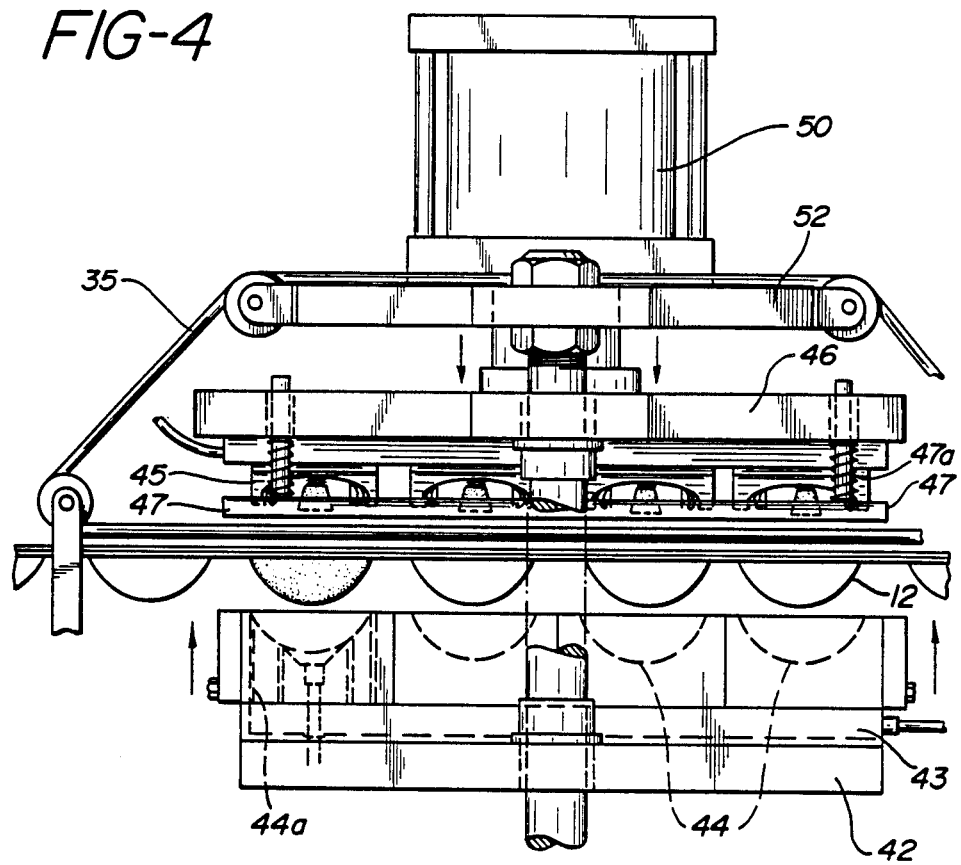
FIG. 4 shows an enlarged elevation view of the heat sealing method and die assembly.

A more detailed view of the heat sealing apparatus 40 is shown by FIG. 4. The lower die unit 42 contains four cavities 44 provided in each of two adjacent rows and which are so shaped to match the formed shells 12. The shells 12 and die cavities 44 can alternatively have a shape which is generally circular, elliptical or polygonal. Also, the lower die unit 42 is provided with a plurality of small flow passage 44a which terminate at the edge of cavities 44, and through which a suitable vacuum pressure is applied to the cavity 44 from passage 43 to facilitate the shells 12 being seated firmly in the die cavities 44, particularly along the shell side perimeter.

The upper die unit 46 includes four plugs 45 provided in each of two rows, and a clamping flange 47. The flange 47 is spring-loaded by springs 47a and first contacts the facing sheet 20 to clamp it onto the foam sheet 10 and thereby stabilize the facing sheet relative to the foam sheet. Flange 47 also clamps the foam sheet onto the upper surface of lower die unit 42, prior to the heated plugs 45 contacting the facing sheet to heat soften and bond it onto the foam shells 12. Also movable belt 35 is provided along the sides of the upper die 46 parallel with the edges of the facing sheet 20 to assist in clamping the facing sheet edges downward onto the foam sheet 10.

Figure 4A:
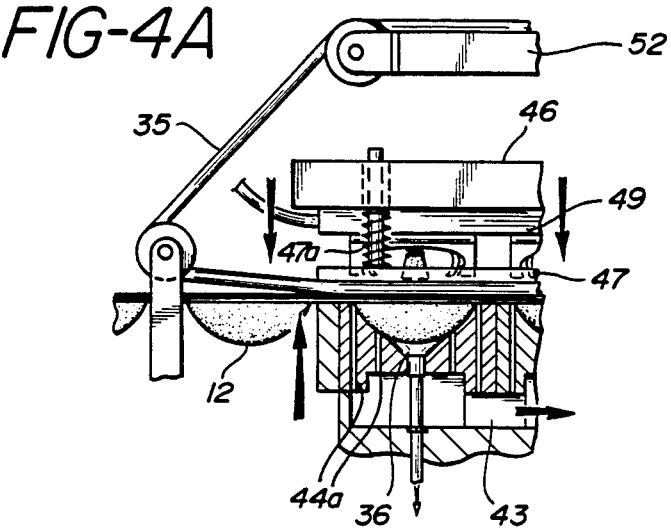
FIG. 4A shows a partial elevation view of a portion of the heat sealing die of FIG. 4 broken away to show the lower die unit in a raised position.

As additionally shown by the partial sectional view FIG. 4A the spring-loaded flange 47 clamps the facing sheet and foam sheet together against the lower die 42, while movable belt 35 additionally holds down the longitudinal edges of the facing sheet 20. Sealing of shells 12 into die cavities 44 is facilitated by vacuum pressure applied to the vertically movable suction cups 36 and at space 43 connected to air flow passages 44a.

Figure 4B:
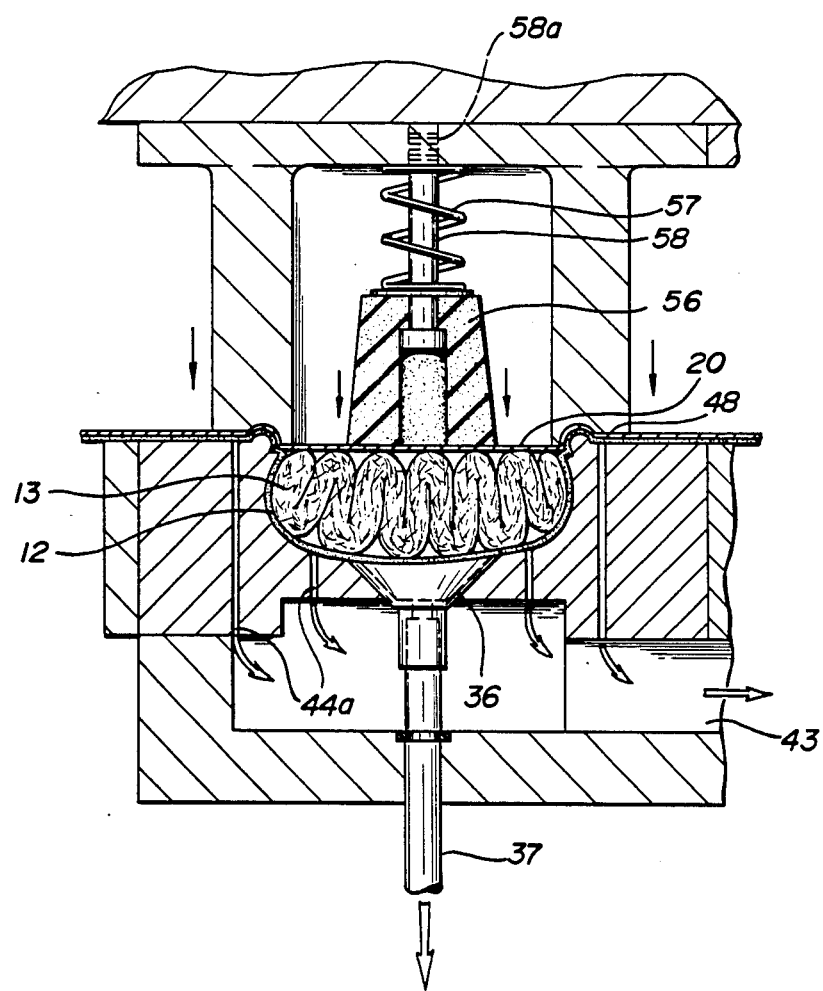
FIG. 4B shows another partial section view of the heat sealing die unit taken at section 4—4 of FIG. 2.

The location of heat sealing surfaces 48 of plug 45 relative to the perimeter of a formed shell product 12 containing an insert piece 13 is additionally shown by FIG. 4B. The plug member 45 is provided with a centrally located inner plug 56 which is spring loaded by compression spring 57 provided around support 58 which is adjustably attached to upper die member 46 by threaded connection 58a. The lower surface of inner plug 56 serves to press downwardly on the central portion of the facing sheet 20 during heat sealing it onto foam sheet 10. Inner plug 56 is made of a rigid material having low heat conductivity, such as molded fiberglass or a high density plastic foam material.

For operation of the heat sealing step and apparatus at 40, the foam sheet 10 is indexed forward intermittently and the shells 12 are aligned within the cavities 44 in the lower die member 42. Then the upper die member 46 is moved downward by piston 50 and forces a central portion of the facing sheet 20 adjacent the slits 20a to move laterally towards the shells 12, so as to permit the facing sheet 20 to be forced downwardly against the non-planar upper surface of the shells 12. Then the heated sealing surface 48 rapidly heats and softens both the facing sheet 20 and a portion of the adjacent upper surface of foam sheet 10 to its softening temperature of 130°-250° F. and quickly heat seals these heated sheets together within a time period of about 0.5-2.5 seconds.

Following this heat sealing operation. the upper die unit 46 is vertically separated from lower die unit 42. The combined facing sheet and foam sheet containing shells 12 are then moved forward intermittently to a subsequent step, such as a shell cut out step at 60 generally indicated by FIG. 1. A new portion of facing sheet 20 containing formed shell(s) 12 is positioned in the heat sealing die assembly 42, 46 for sealing. The resulting scrap facing sheet 20 combined with foam sheet 10 but without multiple cavities 12 is passed under roller 64 and is withdrawn at 65. After cutting out the shaped covered shells 12 from the foam strip 10, the resulting covered formed shell products are removed at 66.

The present invention can be advantageously and preferably used for producing formed flexible absorbent products 66 having a general elongated shape as shown by FIG. 5, for which a thin fibrous facing sheet is heat sealed onto the perimeter of the product upper flanged surface. However, this invention can also be used for producing other shaped articles and products which require a rapid heat sealing operation for a porous facing sheet along a non-planar surface.

This invention will be further described by reference to the following example of heat sealing operation, which should not be construed as limiting in scope.

EXAMPLE

A flexible polyethylene foam sheet is provided in which elongated shaped shells have been formed, each shell being spaced apart at 5 inch intervals in the sheet. Dimensions for each shell are 6/7 inch long and 4 inch wide and 1 inch deep and having a central portion which is depressed by 2.75 inch relative to the shell end portions. Each shell contains a fibrous web insert piece. Also, a thin facing sheet consisting of a liquid permeable fibrous web is provided above the foam sheet. Other characteristics of the foam and facing sheets are as follows:

| Foam sheet material | closed-cell polyethylene |
| --- | --- |
| Foam sheet thickness, in. | 0.125 |
| Foam sheet width, in. | 16 |
| Facing sheet material | non-woven polyester web |
| Facing sheet thickness, in | 0.010 |
| Facing sheet width, in. | 20 |

The facing sheet is first clamped between mating plates and then slit transversely within its central portion to a 5 inch long slit at spaced intervals located between the formed shells in the foam sheet.

The slit facing sheet is moved adjacent the foam sheet and both sheets are indexed forward to a heat sealing die assembly. The formed shells, which each contain a corrugated fibrous insert piece, are each sealed into a lower cavity of the die assembly lower unit with the aid of vacuum pressure applied to holes provided in each cavity. Then the upper die unit containing an outer clamp and heated plugs descends so that the facing sheet is clamped onto the foam sheet and the heated plugs interfit within the die cavities. During the clamping the central portions of the facing sheet adjacent the slits move laterally toward the shells, then the heated plugs rapidly soften the fibrous facing sheet and the foam sheet upper surface and heat seals the facing sheet onto the foam sheet at location around the perimeter of the formed shells. Important characteristics of the heat sealing method and die assembly are as follows:

| Facing sheet slit length, in | 5 |
| --- | --- |
| Foam sheet softening temp., °F. | 200 |
| Sealing plug temperature, °F. | 300 |
| Facing sheet sealing time, sec. | 2 |

Following the facing sheet heat sealing step, the mating die units are separated and the foam sheet containing the covered shells is indexed forward to a subsequent shell cut out step.

Although this invention has been described broadly and also in terms of a preferred embodiment, it will be understood that modifications and variations in the materials, method steps and apparatus can be made within the scope of the invention, which is defined by the following claims.

I claim:

1. A method for attaching a porous facing sheet onto a non-planar surface of a plastic foam sheet, comprising:
   (a) providing formed plastic foam shells integrally attached to a foam sheet, each said shell having a central cavity depth of at least about 0.5 inch and a downwardly curved non-planar upper surface;
   (b) applying a porous facing sheet onto the curved non-planar surface of the formed foam shell by intermittently slitting the facing sheet at spaced intervals transverse to the sheet length and intermediate the formed shells;
   (c) moving the shell and facing sheet together near a heating and sealing unit having a heating plug member, and contacting the combined facing sheet and adjoining foam shell with the heating unit and forcing at least a portion of said facing sheet downwardly into contact with the downwardly curved non-planar upper surface of the shell; and (d) rapidly heating the facing sheet and shell upper surface with the heating plug member at the softening temperature of the foam shell and heat sealing the facing sheet onto the perimeter of the foam shell upper surface, so as to provide a covered flexible shell product.

2. The method of claim 1, wherein the foam shell and slit facing sheet are clamped together along the upper surface of the shell prior to heat sealing the sheet onto the formed shell.

3. The method of claim 1, wherein said slit facing sheet and shell upper surface perimeter are each heated to a temperature of 130°–250° F. to heat seal the facing sheet onto the shell upper surface.

4. A method for attaching a fibrous porous facing sheet onto a non-planar, surface of a flexible plastic foam shell, comprising:

(a) providing a formed ethylene-containing polymer foam shell integrally attached to a foam sheet, said shell having a depth at least about 0.5 inches and having a downwardly non-planar upper flanged surface;

(b) providing a fibrous facing sheet and intermittently transversely slitting the sheet and applying it to the upper non-planar surface of the foamed shell, said formed shell having a softening temperature of 130°–250° F.;

(c) moving the shell and facing sheet together near a heating and sealing unit having a plug member, and contacting the combined facing sheet and shell upper surface with the heating unit and forcing at least a portion of said facing sheet downwardly into contact with the downwardly curved non-planar upper surface of the shell; and (d) rapidly heating the facing sheet and shell upper non-planar surface with the heating unit to 200°–500° F. and heat sealing the facing sheet onto the perimeter of the foam shell upper surface, so as to provide a heat sealed covered flexible shell product.

* * * * *